M. J. SHIMER.
SUPPORTING DEVICE.
APPLICATION FILED SEPT. 21, 1911.

1,015,717.

Patented Jan. 23, 1912.

WITNESSES
Edw. Thorpe

INVENTOR
Milton J. Shimer
BY
ATTORNEYS

UNITED STATES PATENT OFFICE.

MILTON J. SHIMER, OF FREEMANSBURG, PENNSYLVANIA.

SUPPORTING DEVICE.

1,015,717. Specification of Letters Patent. Patented Jan. 23, 1912.

Application filed September 21, 1911. Serial No. 650,550.

*To all whom it may concern:*

Be it known that I, MILTON J. SHIMER, a citizen of the United States, and a resident of Freemansburg, in the county of Northampton and State of Pennsylvania, have invented a new and Improved Supporting Device, of which the following is a full, clear, and exact description.

The invention relates to flag pole supports, and its object is to provide a new and improved supporting device, more especially designed for use on automobiles and other vehicles, and arranged to permit of securely fastening the pole for a flag, pennant or other article to a suitable support such as a wind shield or other part of the vehicle.

For the purpose mentioned, use is made of an attaching clamp, and a supporting clamp mounted to turn on the said attaching clamp and fastened thereto on fastening the attaching clamp to a suitable support.

A practical embodiment of the invention is represented in the accompanying drawings forming a part of this specification, in which similar characters of reference indicate corresponding parts in all the views.

Figure 1:
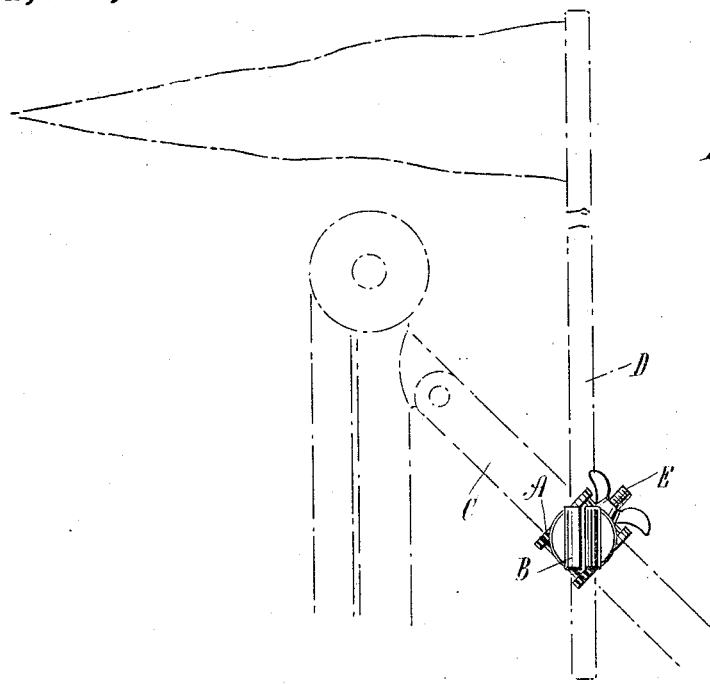
Figure 2:
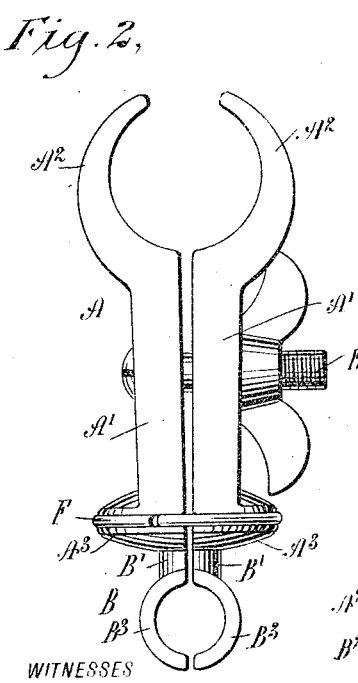
Figure 3:
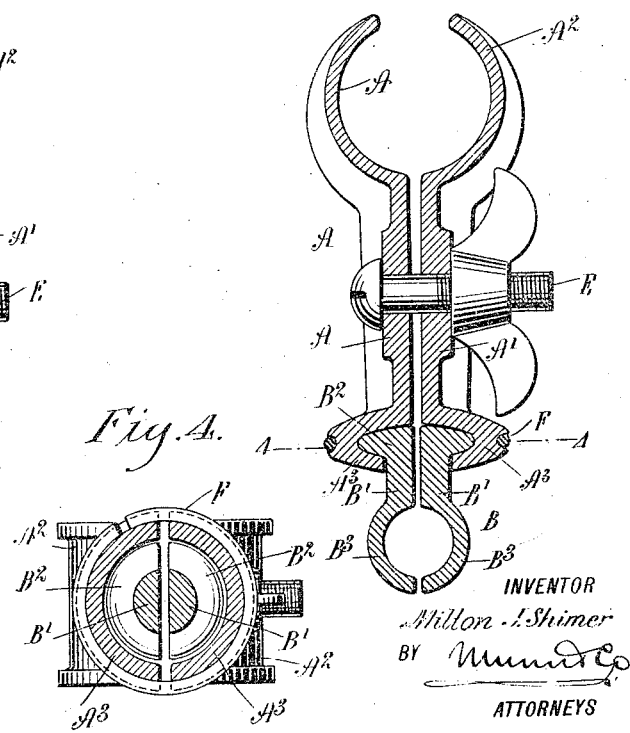
Figure 4:
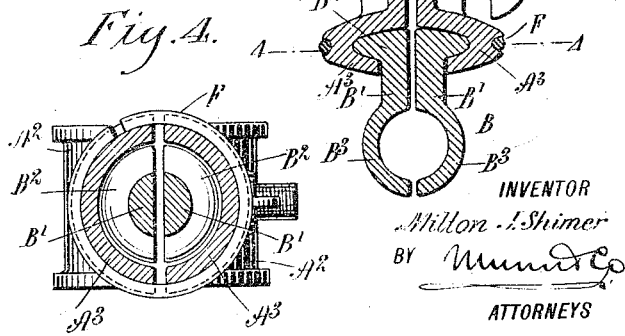

Figure 1 is a side elevation of the supporting device as applied to the wind shield of an automobile for supporting a flag or pennant; Fig. 2 is a plan view of the supporting device; Fig. 3 is a sectional plan view of the same; and Fig. 4 is a sectional side elevation of the same on the line 4—4 of Fig. 3.

The supporting device consists essentially of an attaching clamp A and a supporting clamp B, of which the attaching clamp A is adapted to be removably secured to the brace C or other part of a wind shield or other support, and the supporting clamp B is adapted to receive and support the pole D of a flag or a pennant, or for supporting any other desired article.

The attaching clamp A is formed of two members $A'$, $A'$ fastened together by a clamping bolt E, and the said members $A'$ terminate at one end in jaws $A^2$ for engagement with the brace C or other support, so that when the nut of the clamping bolt E is screwed up the jaws $A^2$ firmly close around the brace C or other support to fasten the attaching clamp A securely in position on the said support. The outer ends of the members $A'$ of the attaching clamp A terminate in a bearing $A^3$, and the supporting clamp B is formed of two members $B'$ terminating at one end in journals $B^2$ mounted to turn in the said bearing $A^3$, as will be readily understood by reference to Figs. 3 and 4. The outer ends of the members $B'$ of the supporting clamp B terminate in jaws $B^3$ adapted to engage a pole D or other device to be supported, it being understood that the attaching clamp B can be turned in the bearing $A^3$ previous to tightening the members $A'$ by the clamping bolt E so that the jaws $B^3$ extend in the desired direction for supporting the pole D or other support vertically, or in any other position, as desired. When the nut of the clamping bolt E is screwed up the sectional bearing $A^3$ firmly clamps the sectional journal $B^2$ in place when holding the supporting clamp B in the desired position with the flag pole D standing vertically or in whatever position it is desired to be in. A ring F, of spring wire or other material, engages an annular groove formed exteriorly in the bearing $A^3$ so as to hold the members $A'$, $A'$ of the attaching clamp A together when placing the said clamp A in position on the brace C or other support.

From the foregoing it will be seen that the attaching clamp A can be readily secured to suitable supports which may be vertical, horizontal and in an angular position, and the supporting clamp B can be readily turned in the bearing $A^3$ of the attaching clamp A so as to move the jaws $B^3$ into position for supporting the flag pole D in the desired position, as will be readily understood by reference to Fig. 1.

The supporting device is very simple and durable in construction and can be readily applied to a suitable support, and the parts constituting the supporting device are not liable to get out of order or lost owing to the ring F holding the members $A'$ together.

Having thus described my invention, I claim as new and desire to secure by Letters Patent:

1. A supporting device for flag poles and other articles, comprising an attaching clamp, a supporting clamp mounted to turn on the said attaching clamp, and a single fastening device for fastening the attaching clamp to a support and for fastening the said attaching clamp to the supporting clamp.

2. A supporting device for flag poles and other articles, comprising a sectional attaching clamp for attachment to a support and provided with a bearing, a supporting clamp made in sections and mounted to turn in the said bearing, and a single fastening device for fastening the attaching clamp in place on the support and for clamping said attaching clamp on the supporting clamp to hold the latter against turning.

3. A supporting device for flag poles and other articles, comprising an attaching clamp made in sections, and having jaws for engagement with a support, and also having a bearing, a supporting clamp made in sections and having a journal portion mounted to turn in said bearing, and a fastening device for the sections of the attaching clamp to clamp the jaws of the attaching clamp to the support and to clamp the bearing of said attaching clamp on the journal portion of said supporting clamp.

4. A supporting device for flag poles and other articles, comprising an attaching clamp formed of two members terminating at one end in jaws for engagement with a support and at the other end in bearings, a supporting clamp comprising two members provided at their outer ends with jaws for engagement with the article to be supported, and terminating at their inner ends in journals mounted to turn in said bearings, a clamping bolt extending through the members of the attaching clamp between the jaws and the said bearings, and a nut on the clamping bolt for drawing the said members together to cause the jaws of the said attaching clamp to clamp the said support, and to move the said bearings into clamping engagement with the journal portions of the supporting clamp, thereby causing the jaws of the supporting clamp to clamp the article to be supported.

5. A supporting device for flag poles and other articles, comprising an attaching clamp made in sections fastened together by a clamping bolt, the attaching clamp being provided on one end with jaws for engagement with a support and provided at the other end with a bearing, a supporting clamp made in sections provided with a journal mounted to turn in the said bearing, and jaws for engagement with a flag pole, and means for holding the members of the attaching clamp together when placing the said clamp in position on the support.

6. A supporting device for flag poles and other articles, comprising an attaching clamp made in sections fastened together by a clamping bolt, the attaching clamp being provided at one end with jaws for engagement with a support and provided at the other end with a bearing, and a supporting clamp made in sections provided with a journal engaging the said bearing, jaws for engagement with a flag pole, and a ring encircling the said bearing.

In testimony whereof I have signed my name to this specification in the presence of two subscribing witnesses.

MILTON J. SHIMER.

Witnesses:
  S. D. SHIMER,
  WESTON JOHN.